Figure 1:
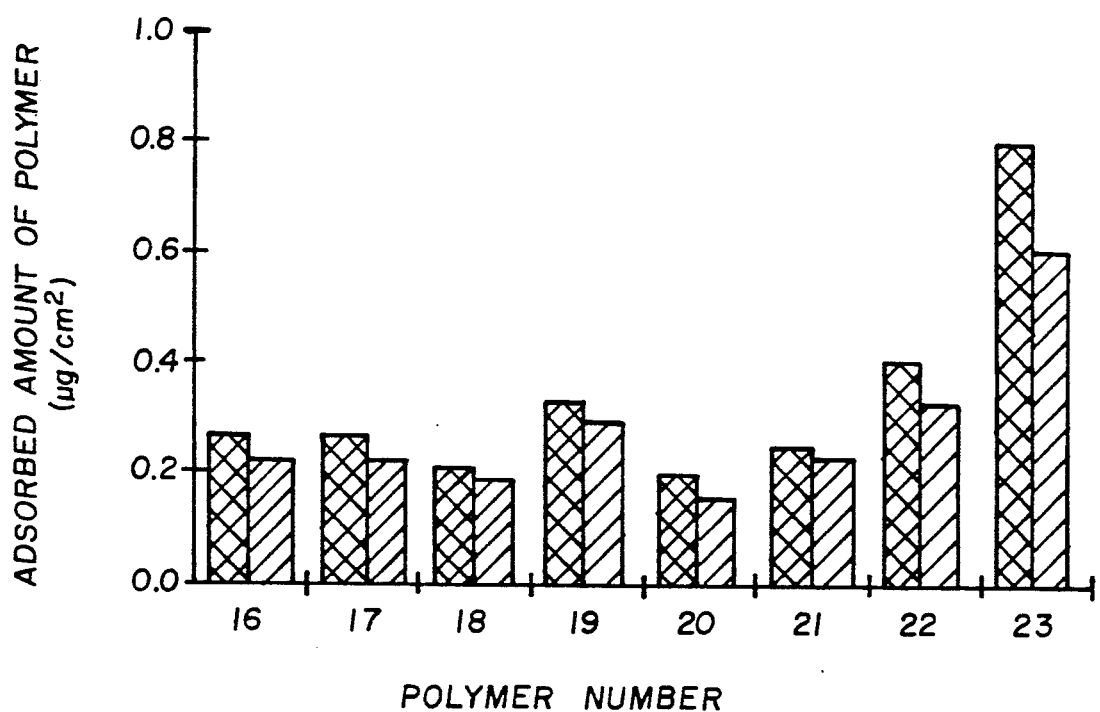

United States Patent [19]

Andrade et al.

[11] Patent Number: 5,075,400

[45] Date of Patent: Dec. 24, 1991

[54] POLYMER SUPERSURFACTANTS FOR PROTEIN RESISTANCE AND PROTEIN REMOVAL

[75] Inventors: Joseph D. Andrade; Jindrich Kopecek; Jin H. Lee, all of Salt Lake City, Utah

[73] Assignee: University of Utah, Salt Lake City, Utah

[21] Appl. No.: 493,215

[22] Filed: Mar. 14, 1990

Related U.S. Application Data

[63] Continuation of Ser. No. 247,746, Sep. 22, 1988, abandoned.

[51] Int. Cl.$^5$ ............................................. C08F 20/62
[52] U.S. Cl. ............................ 526/307.5; 526/318.41; 526/312; 526/320
[58] Field of Search ................ 526/318.41, 307.5, 312, 526/320

[56] References Cited

U.S. PATENT DOCUMENTS

4,424,311 1/1984 Nagaoka et al. ..................... 526/320

Primary Examiner—Joseph L. Schofer
Assistant Examiner—Jeffrey T. Smith
Attorney, Agent, or Firm—K. S. Cornaby

[57] ABSTRACT

The invention discloses the processes and materials for treating materials to minimize the deposition of proteins and other molecules, and for removing proteins and other molecules from materials. New copolymers containing polyethylene oxide sidechains called supersurfactants have the ability to bind themselves to interfaces to provide a stable protein-resistant interface. A process is presented to treat and modify interfaces with the new copolymers.

5 Claims, 2 Drawing Sheets

POLYMER SUPERSURFACTANTS FOR PROTEIN RESISTANCE AND PROTEIN REMOVAL

This is a continuation of application Ser. No. 07/247,746, filed Sept. 22, 1988, now abandoned.

BACKGROUND OF THE INVENTION

The present invention relates to materials and processes for (1) treating materials to minimize the deposition of proteins and other molecules; and (2) removing proteins and other molecules from materials. We use the word protein because we expect major applications will involve protein solutions. However, we understand that the processes and materials described apply to all interfacial adsorption, deposition and aggregation processes.

There are many applications where materials and devices must contact various aqueous and other solvent media; including biologic and physiologic solutions. Such media often contain proteins or other chemicals or biochemicals which can adsorb and/or aggregate at interfaces. For many applications, it is desirable and often necessary to minimize the deposition and aggregation of such molecules. Examples where protein deposition can be undesirable are:

Cardiovascular devices (activation of coagulation, thrombosis, and/or complement);
Ophthalmologic devices (activation of biochemical process, impaired optical properties);
Blood bags and related devices for collection and storage of blood and blood components;
Food processing and storage, including dairy and meat industries;
Pharmaceutical products (adsorption and denaturation of peptides or other active agents);
Human hygiene products (such as diapers and sanitary napkins);
Membranes (polarization and fouling); Sensors (non-specific binding);
Separation processes, such as chromatography, electrophoresis, and field flow fractionation;
Process biotechnology and biochemical engineering (adsorption and aggregation at reactor interfaces and at bubbles and other gas/liquid or vacuum/liquid interfaces).

In all of the above, and other, applications, it is desirable to have *simple* materials and processes with which to treat the interfaces in order to minimize protein adsorption, deposition and aggregation. In cases where proteins are adsorbed to untreated interfaces, materials or devices, it is desirable to have *simple* means of removing the proteins (a good example is the cleaning of contact lenses).

OBJECT

We and others have shown that polyethylene oxide (PEO) (also called polyethylene glycol or PEG), when bound to an interface, results in effective protein resistance in aqueous solutions. Although other neutral, hydrophilic polymers are also effective, PEO is exceptionally effective in promoting protein resistance, due to its unique interactions with water. We and others have shown that non-polymeric and block copolymer surfactants containing PEO can be adsorbed at interfaces to provide protein resistance. Such adsorption is often not very stable, however, and the protein resistance effect is not optimal.

It is the object of the present invention to overcome the mentioned problem by:

1. Describing a novel composition of matter, a copolymer containing PEO sidechains, which is molecularly engineered to optimally bind to interfaces to provide a stable, long-lived, effective protein-resistant interface; and
2. Describing a process for the effective treatment and modification of interfaces by these new polymers.

We call these polymers "supersurfactants".

There is provided a polymer surfactant compositions containing PEO chains, spacers, and components to provide strong binding to the interface of interest.

This invention specifically excludes (1) polyurethanes and other block copolymers containing PEO blocks;
(2) PEO tri-block and related copolymer surfactants of the Pluronic, Tetronic and/or polyalloxomer types;
(3) graft copolymers of PEO-containing monomers with vinylchloride and/or vinyl acetate; and
(4) other processes for grafting PEO onto existing solid materials.

This invention does include those compositions designed to provide binding of the supersurfactant from solution onto suitable interfaces by hydrophobic, ionic, and solvent-phobic interactions. The PEO chain-containing polymers have a minimum PEO chain molecular weight of about 200, below which the protein resistance chemically deteriorates. At 4000 and above, the polymers have approximately the same properties. The PEO chain spacing along the copolymers falls within the range of 4-20 Å. It's chemically very difficult to space any closer than 4 Å; and at larger separations the protein resistance properties deteriorate significantly.

As illustrative of the above, the following examples are cited:

(a) co-monomers containing alkyl chains or groups to provide hydrophobic binding at hydrophobic interfaces, such as air or gas/liquid interfaces and solid/liquid interfaces where the solid/water contact angle is greater than 20°; such co-monomers could include:

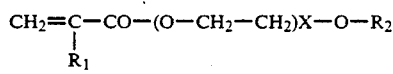

where X is 6 to 200, $R_1$ is H or $CH_3$ and $R_2$ is H or $C_1$ to $C_8$ alkyl;

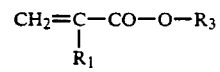

where $R_3$ is $C_1$ to $C_2$ alkyl; and

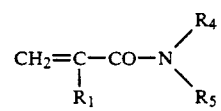

where $R_4$ and $R_5$ are H or $C_1$–$C_8$ alkyl, acrylic acid, methacrylic acid, diacetone, arylamide, N-vinyl pyrrolidone, diethylaminoethyl methacrylate, and dimethylaminoethyl methacrylate;

(b) co-monomers containing fluoro-alkyl chains or groups to provide hydrophobic or fluorophilic bonding to hydrophobic or fluorocarbon surfaces;

(c) co-monomers containing various siloxane components to provide binding to siloxane and other hydrophobic surfaces;

(d) co-monomers containing negatively-charged groups to provide electrostatic interactions with positively-charged surfaces;

(e) co-monomers containing positively-charged groups to provide electrostatic interaction with negatively-charged surfaces;

(f) co-monomers with an approximate ratio of hydrophobic, fluorophilic, positive or negative character to optimally interact with the multiple binding character of a complex interface.

In all cases, the objective is to produce interfaces containing sufficient PEO to minimize protein deposition.

The monomers used in this process have a carbon-carbon double bond and can be copolymerized by conventional radical initiators such as, for example, benzoyl peroxide, asobisisobutyronitrile, and azobisdimethylvaleronitrile.

After copolymerization, the coplymers are isolated by precipitation into a suitable precipitant. However, it is possible to use the polymerization mixture directly (after adjusting the copolymer concentration) for the deposition on biomaterial surfaces. The unreacted monomers may be rinsed off by proper solvent. These procedures, and other will be explained in further detail below.

THE DRAWINGS

Figures 2, 2A, 2B:
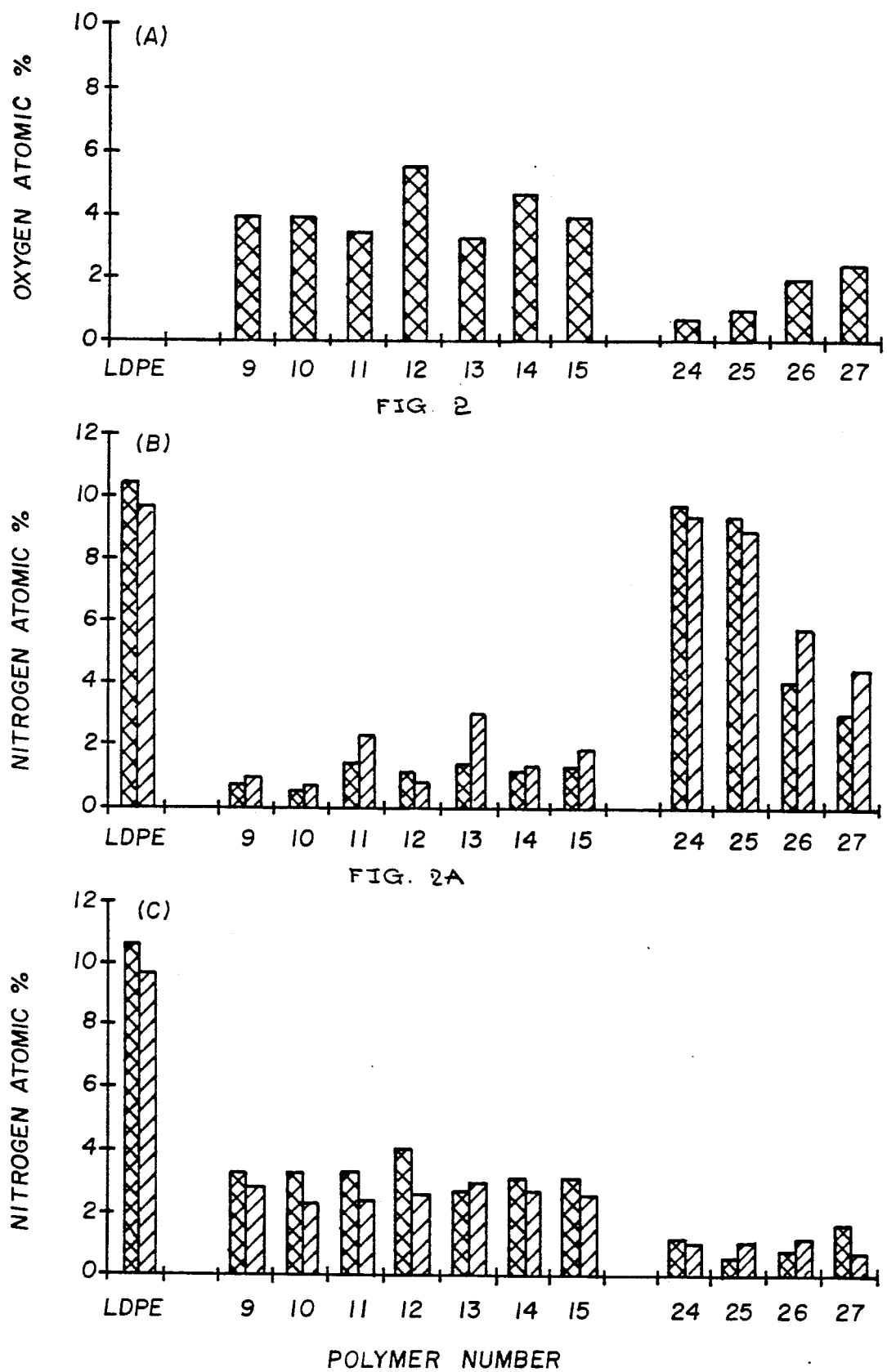

Graphs corresponding to data described in the application are set forth in the following drawings:

FIG. 1 is a graph showing the adsorbed amount of polymers on LDPE surface before and after protein adsorption; and FIGS. 2, 2A and 2B is a comparison of surface properties between the synthesized copolymers and selected commercial surfactants.

FIG. 1—Adsorbed amount of polymers on LDPE surface before and after protein adsorption (protein adsorption, human albumin 1 mg/ml, 30 minutes; polymer treatment, 30 minutes desorption in water after 30 minutes adsorption in 1 mg/ml polymer solution; cross-hatched bars, before protein adsorption; diagonal bars, after protein adsorption) (n=3)

FIGS. 2, 2A and 2B—Comparison of surface properties between the synthesized copolymers and selected commercial surfactants (n=3-5)

FIG. 2—Adsorption of polymers on LDPE surface

FIG. 2A—Protein resistance of polymer-treated LDPE surfaces

FIG. 2B—Removal properties of pre-adsorbed protein on LDPE surfaces by polymer solution treatment (cross-hatched bars, albumin 1.0 mg/ml adsorption; diagonal bars, plasma 1.0% adsorption).

REAGENTS

Monomethoxy poly (ethylene oxide)$_{1900}$methacrylate (MPEO$_{1900}$MA). (1900 is the approximate molecular weight.) To a well-stirred solution of 15.2 g (8 mmol) monomethoxy poly (ethylene glycol) (Polyscience) in 20 ml dry methylene chloride (CH$_2$Cl$_2$) cooled to 5° C., 1.67 g (16 mmol) methacryloyl chloride in 2 ml methylene chloride and 1.62 g (16 mmol) triethyl amine was added slowly dropwise. After that the reactants were stirred at room temperature overnight (in the presence of small amount of inhibitor, tert. octylpyrocatechine). Precipitated triethyl amine hydrochloride was filtered off, macromonomer was isolated by precipitating the solution into cooled diethyl ether and powdered polymer was washed thoroughly with diethyl ether and dried.

Monomethoxy poly (ethylene oxide)$_{4000}$methacrylate (MPEO$_{4000}$MA) was kindly provided by S. Nagaoka (Toray Industries, Inc., Kanagawa, Japan). (We call MPEOMA as "macromonomer" because it is a big molecule with a long PEO chain, while it is a monomer with a species bearing a polymerizable function at the chain end [a methacryloyl end group].)

2.2′-azobisisobutvronitrile (AIBN) (Aldrich) was purified by recrystalliztion from methanol and used as an initiator for polymerization.

Methyl methacrylate (MMA), hexyl methacrylate (HMA) and lauryl methacrylate (LMA) (Polyscience) were freshly distilled under reduced pressure before use.

EXAMPLES OF PREPARED COPOLYMERS

Example 1

The copolymers were prepared by random polymerization of the monomers in toluene for 45 hours at 50° C.

A polymerization mixture, containing 14.0 wt% of monomers, a 0.6 wt% of AIBN and 85.4 wt% toluene, was bubbled with nitrogen for 15 minutes then sealed in an ampoule. After the polymerization has been finished, the volume of polymer solution was reduced by approximately 50% using a rotary vapor evaporator under reduced pressure. Polymers were precipitated into cooled diethyl ether, washed and dried. To remove non-copolymerized macromonomer (about 20%, determined by gel permeation chromatography [GPC]), the polymers containing PEG$_{1900}$ were dialyzed three days in Visking dialysis tubing (Mol. wt. cut-off, 6,000-8,000). The polymers containing PEG$_{4000}$ were purified by using ultrafiltration (Amicon, membrane PM-30). The polymers were then isolated using lyophilization. Table 1. shows the list of the synthesized copolymers. Each entry on the Table may be considered a specific example. As most of the polymers were not directly soluble in water or aqueous buffers, a special procedure was used for preparation of aqueous solutions for surface tension or adsorption studies, GPC measurement or purification using dialysis or ultrafiltration. 100 mg of polymer was dissolved in 5 ml warm ethanol (about 50° C.), then diluted with 20 ml of water and subsequently dialyzed against water (for surface tension and adsorption studies) or against Tris buffer (for GPC measurement). Then the solutions were diluted to the concentrated needed. The polymers can also be applied in mixed solvents such as a water-ethanol mixture, or can be applied in organic solvents such as ethanol.

TABLE 1

Composition of PEO-containing surfactants used.

SYNTHESIZED METHACRYLATE COPOLYMERS[a]

| Polymer | Hydrophobic |

TABLE 1-continued

| Composition of PEO-containing surfactants used. | | | | | | | |
|---|---|---|---|---|---|---|---|
| No. | MPEO$_{1900}$MA | MPEO$_{4000}$MA | MMA | HMA | LMA | MA-Tyr-NH$_2$ | units, WT % |
| 9 | 20 | — | 20 | 60 | — | — | 22 |
| 10 | 25 | — | 20 | 55 | — | — | 17 |
| 11 | 25 | — | 40 | 35 | — | — | 16 |
| 12 | 25 | — | 20 | 0 | 55 | — | 24 |
| 13 | — | 20 | 20 | 60 | — | — | 12 |
| 14 | — | 20 | 20 | — | 60 | — | 17 |
| 15 | — | 15 | 35 | — | 50 | — | 16 |
| 16 | 20 | — | 19 | 60 | — | 1 | 22 |
| 17 | 25 | — | 19 | 55 | — | 1 | 18 |
| 18 | 25 | — | 39 | 35 | — | 1 | 16 |
| 19 | 25 | — | 19 | — | 55 | 1 | 25 |
| 20 | — | 20 | 19 | 60 | — | 1 | 12 |
| 21 | — | 20 | 19 | — | 60 | 1 | 17 |
| 22 | — | 15 | 34 | — | 50 | 1 | 21 |
| 23 | — | 10 | 19 | — | 70 | 1 | 32 |

| COMMERCIAL BLOCK COPOLYMER SURFACTANTS | | | | |
|---|---|---|---|---|
| Polymer sample No. | Chain length | | | Wt % |
| | PEO | PPO | PBO | PEO |
| 24 (Triblock) | 13 | 30 | — | 40 |
| 25 (Triblock) | 13 | — | 25 | 40 |
| 26 (Star-like block) | 26 | 29 | — | 40 |
| 27 (Alternate block) | 13 | 30 | — | 40 |

$^a$composition, mol %

Example 2

Adsorption of Copolymers onto Hydrophobic Surfaces

Polymer materials to be treated (low density polyethylene film (LDPE, NHLBI DTB Primary Reference Material)) were immersed in the copolymer solutions (1.0 mg/ml) at room temperature for 30 minutes for adsorption (a 30 minute exposure was sufficient to achieve equilibrium). The copolymer-adsorbed films were rinsed in purified water and then immersed again in purified water for 30 minutes for desorption. After rinsing again in purified water, the copolymer-treated surfaces were vacuum dried overnight in an air atmosphere for X-ray photoelectron spectroscopy (XPS) analysis The oxygen 1S peak from the wide scan was used for the analysis of adsorbed copolymers.

For the quantitation of the copolymer adsorption, small amount of methacryloyl tyrosinamide (MA-Tyr-NH2) was introduced in the structure of copolymers during synthesis. The tyrosin content in all copolymers was 16±3 nmol/mg (or about 1.5 mol%). The copolymers were labeled with Iodine-125 using the modified Chloramine-T method. The iodination reaction time was 4 hours and the reaction mixture was continuously shaken during reaction. After iodination, the $^{125}$I-labeled copolymer solution was passed twice through the Sephadex G-25 mini-columns prepared separately to remove free $^{125}$I. The polymer materials to be treated (LDPE films), whose surface area was predetermined, were immersed in a solution of known ration of $^{125}$I-labeled and unlabeled polymer and adsorption was done with the same procedure as in the case for the samples for XPS analysis. After copolymer adsorption and following rinsing, the copolymer-treated films were directly placed in counting vials and the retained radioactivity was measured in a gamma counter and converted to the values of the adsorbed amount of polymer on the surface.

Table 1 lists the copolymers synthesized for XPS analysis and for Iodination labeling. FIG. 1 shows adsorbed amount of copolymers on the LDPE surfaces. FIG. 1 also shows that the copolymers are stably adsorbed on the surface, after protein (human serum albumin) exposure.

Example 3

Protein-resistant Properties of the Copolymer-treated Surfaces

The copolymer-treated LDPE films were immersed in protein solutions (human albumin, 1.0 mg/ml or plasma 1.0%) prepared with phosphate buffer saline (PBS) at pH 7.4 for 30 minutes and rinsed in PBS, following by rinsing in purified water and vacuum drying, then the prepared samples were analyzed by XPS. The nitrogen 1S peak was used for the analysis of adsorbed protein. The $^{125}$I-labeled copolymer-treated surfaces were also used and radioactivity was counted both before and after protein adsorption on those surfaces, to see the effect of exchange of the protein with the copolymer preadsorbed on the surface (see FIG. 1).

FIG. 2, 2A and 2B compares the surface properties of the copolymers with those of some selected commercial block surfactants containing PEO and polypropylene oxide (PPO) or polybutylene oxide (PBO). Oxygen atomic % from XPS analysis in FIG. 2 represents adsorption of the polymers on the LDPE surface, even though exact comparison is not available because the polymers contain different numbers of oxygen. In FIG. 2 (A), nitrogen atomic % represents the relative adsorbed amount of protein on the polymer-treated LDPE surfaces. As seen in FIG. 2 (A), the synthesized copolymers show much better protein (albumin and plasma) resistance than the commercial block surfactants, probably due to larger amount of adsorption and longer PEO chains which Provide high mobility in water.

Example 4

Removal of Pre-adsorbed Proteins by the Polymer Treatment

For protein adsorption of the LDPE surfaces, LDPE films were immersed in protein solutions (human albumin, 1.0 mg/ml or plasma 1.0 %) prepared with phosphate buffer saline (PBS) at pH 7.4 for 30 minutes and rinsed in PBS, following by rinsing in purified water. After vacuum drying overnight in an air atmosphere, the adsorbed amount of protein on LDPE surfaces was analyzed by XPS. The nitrogen IS peak was used for the adsorbed protein.

The protein pre-adsorbed LDPE films were immersed in the surfactant solution (1.0 mg/ml) for 30 minutes and also rinsed in PBS and purified water, vacuum dried, and then the remained protein on the surface was also analyzed by XPS.

The effectiveness of the synthesized copolymers for removal of proteins pre-adsorbed on LDPE surface was compared with that of the commercial surfactants in FIG. 2 (B). As seen in the Figure, the synthesized copolymers show efficient removal properties of preadsorbed proteins (albumin and plasma), even though the commercial surfactants shows better removal properties. From the studies of XPS analysis, $^{125}$I-labeled copolymers, and $^{125}$I-labeled protein, we can conclude that the proteins are removed from the surface probably by different mechanisms when we use different kinds of surfactant; synthesized copolymers (possibly acting mainly by an exchange mechanism of the protein with the copolymer) and commercial block surfactants (possibly acting by an elution mechanism of the protein by the surfactant.

We claim:

1. Aqueous solutions of soluble polymers and copolymers containing PEO chains together with alkyl chains to provide optimum adsorption onto hydrophobic surfaces, including polyolefins, acrylates, methacrylates, vinyl polymers, hydrophobic block copolymers, such as polyurethanes, and all other polymers and copolymers whose advancing water contact angle is greater than 20°; such soluble polymers and copolymers containing not less than 5% by weight of monomer units A, where A can be represented by the formula:

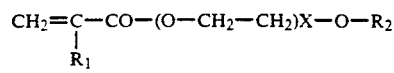

where X is 6 to 200, $R_1$ is H or $CH_3$ and $R_2$ is H or $C_1$ to $C_8$ alkyl.

2. Aqueous solutions of soluble polymers and copolymers as set forth in claim 1, wherein the soluble polymers and copolymers have components bearing respective negative or positive charges to provide optimum adsorption and binding onto respective positive or negative surfaces.

3. Aqueous solutions of soluble polymers and copolymers as set forth in claim 1, wherein the amount of PEO-containing monomer is in the range of 5 to 90% by weight.

4. Aqueous solution of soluble polymers and copolymers as set forth in claim 1, in which one of said comonomers is of the formula:

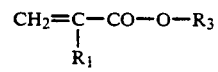

where $R_3$ is $C_1$ to $C_2$ alkyl.

5. Aqueous solutions of soluble polymers and copolymers as set forth in claim 1, wherein one of said comonomers is of the formula:

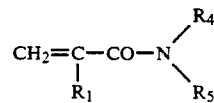

where $R_4$ and $R_5$ are H or $C_1$-$C_8$ alkyl, acrylic acid, methacrylic acid, diacetone, acrylamide; N-vinyl pyrrolidone, diethylaminoethyl methacrylate, and dimethylaminoethyl methacrylate.

* * * * *

UNITED STATES PATENT AND TRADEMARK OFFICE
CERTIFICATE OF CORRECTION

PATENT NO. : 5,075,400
DATED : December 24, 1991
INVENTOR(S) : Joseph D. Andrade Et Al.

It is certified that error appears in the above-identified patent and that said Letters Patent is hereby corrected as shown below:

Title Page, Item 75, Inventors, following "Kopecek" insert -- Pavla Kopeckova --.

Column 2, line 47, the formula should appear as $$CH_2 = \underset{R_1}{C} - CO - (O-CH_2-CH_2)_X - O-R_2$$

Column 2, line 66, delete "arylamide", should read --acrylamide--.

Column 4, line 20, delete "azobisisobutvronitrile", should read --azobisisobutyronitrile--.

Column 4, line 21, delete "recrystalliztion", should read --recrystallization--.

Column 5, line 45, delete "NH2", should read --$NH_2$--.

Column 6, line 59, delete "Provide", should read --provide--.

UNITED STATES PATENT AND TRADEMARK OFFICE
CERTIFICATE OF CORRECTION

PATENT NO. : 5,075,400
DATED : December 24, 1991
INVENTOR(S) : Joseph D. Andrade et al It is certified that error appears in the above-identified patent and that said Letters Patent is hereby corrected as shown below:

Column 8, claim 1, line 1, the formula should appear as $$CH_2 = \underset{R_1}{C}-CO-(O-CH_2-CH_2)_X - O-R_2$$

Signed and Sealed this

Fifth Day of May, 1992

*Attest:*

DOUGLAS B. COMER

*Attesting Officer*    *Acting Commissioner of Patents and Trademarks*